Patented Apr. 1, 1924.

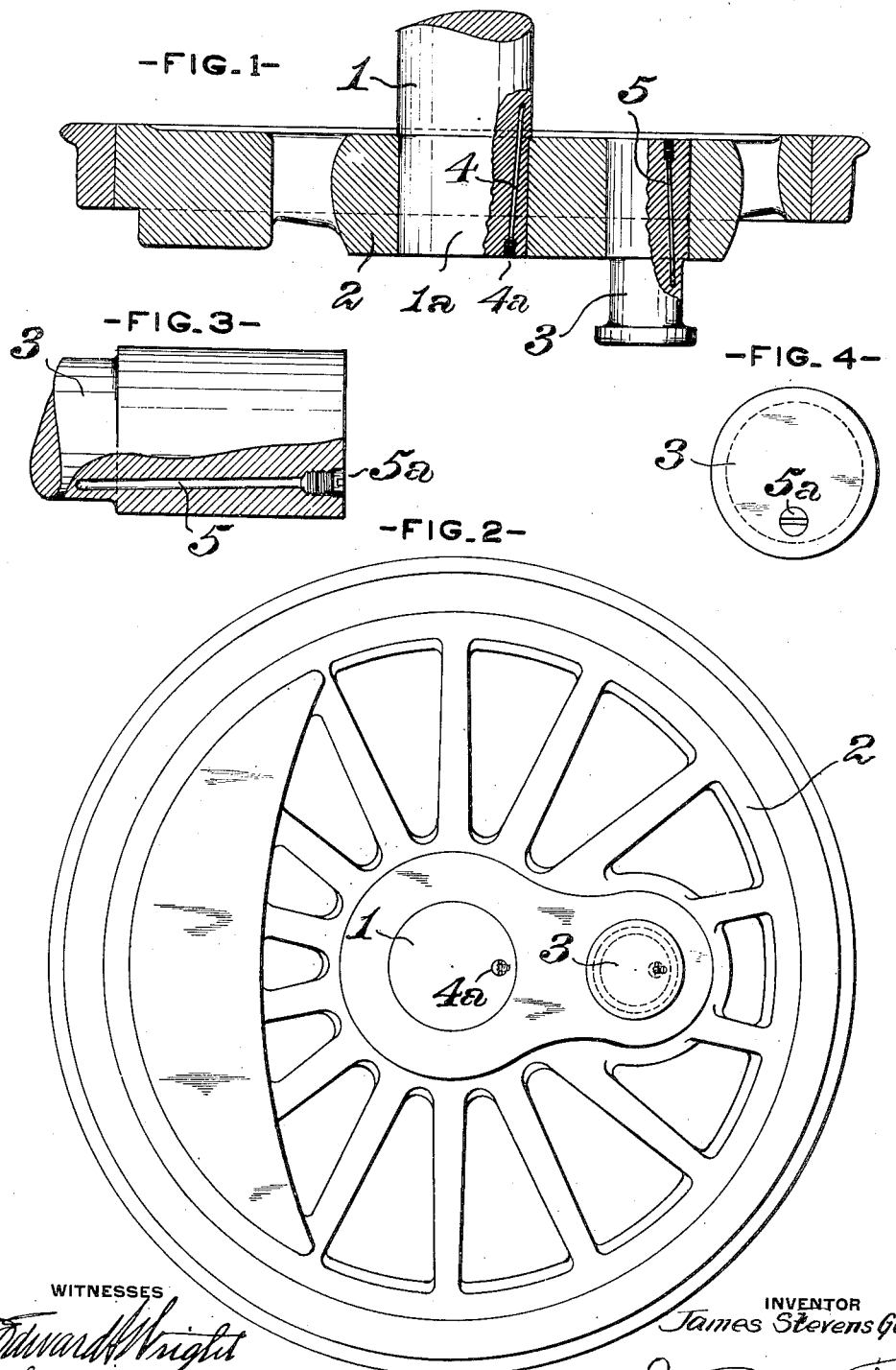

1,488,982

UNITED STATES PATENT OFFICE.

JAMES STEVENS GOYNE, OF HAZLETON, PENNSYLVANIA.

MEANS FOR DETECTING CRACKS IN AXLES AND CRANK PINS.

Application filed September 30, 1918. Serial No. 256,299.

*To all whom it may concern:*

Be it known that I, JAMES STEVENS GOYNE, of Hazleton, in the county of Luzerne and State of Pennsylvania, have invented a certain new and useful Improvement in Means for Detecting Cracks in Axles and Crank Pins, of which improvement the following is a specification.

The object of my invention is to provide simple and effective means whereby cracks or partial separations of the material, which are formed in axles and crank pins, preliminary to the breakage thereof, may be detected in season to prevent such breakage. The improvement claimed is hereinafter fully set forth.

In the accompanying drawing: Figure 1 is a diametral section through a locomotive driving wheel, with the driving axle and crank pin partly in longitudinal section, illustrating an application of my invention; Fig. 2, a view in elevation of the same, as seen from the outer side; Fig. 3, a view, partly in longitudinal section, and on an enlarged scale, of the crank pin, detached, and; Fig. 4, an end view of the same, as seen from the right.

Serious injury to operators of locomotive engines and damage to property, are, from time to time, caused by the breaking of driving axles and crank pins, due, in some cases, to defective material, and, in others, to excessive strains to which they may have been subjected in service. The importance of preventing, or reducing to the minimum, accidents of this character, is manifest, and to this end, my invention is designed to enable such weakened condition of an axle or crank pin as would make its subsequent breakage probable, which is generally indicated by the formation of a crack or fissure in its outer portion, to be readily detected, in order that the defective member may be replaced by a sound one.

In the practice of my invention, which is herein exemplified as applied in connection with a locomotive driving axle, 1, on which is secured a driving wheel 2, carrying, in the usual manner, a crank pin, 3, I form, in one or both the wheel seats, 1ª, of the axle, a longitudinal detector bore, 4, of small diameter, which extends from the outer end of the axle to a point therein which is preferably, as shown, adjacent to the periphery of the journal, but which may, if desired, be located nearer to the axial line thereof, as, say, not less than one fourth the radius therefrom, at which point it terminates by a normally closed inner end. The outer end of the bore, 4, is internally threaded, for the engagement, when desired, of a pipe leading to a fluid pressure pump, and, in order to prevent the entrance of dirt, it is normally closed by a removable plug, 4ª.

When it is desired to test the condition of the axle, which can be done at any time, and conveniently when repairs or inspection of other parts are being made, the plug, 4ª, is removed, and a pipe leading to a test pump, is connected to the outer end of the detector bore. Pressure from the pump, indicated by a suitable gauge, is then applied, and if a crack should have been formed adjacent to the inner end of the detector bore, it will be indicated by the escape of liquid from it, as forced in by the test pump. The axle should then be examined, and ordinarily should be removed, as the presence of the crack is clearly indicative of such weakness as would render it unsafe for further service.

The crank pin, 3, may, as shown, be provided with a similar detector bore, 5, extending from an open end on the inner side of the driving wheel, to a point located as above stated, relatively to the periphery of the journal, and preferably closed by a removable plug, 5ª. The test of the crank pin is made in the same manner as that of the driving axle, as above described.

While my invention would probably have its widest field of application in locomotive and other steam engines, it is obviously not limited to such application, and will be found of advantage in connection with other mechanism in which rotating members, especially those operating at comparatively high speeds, are, in operation, subject to alternate strains of compression and tension.

In conclusion it is desired to point out that a vacuum may be employed in connection with the above described means, in making a test for a cracked axle, as well as employing a fluid under compression. The vacuum apparatus is applied to the open end of the bore 4 in Figure 1, for example, and if upon operation of said apparatus a vacuum to the desired degree is obtainable, then the operator will know that there is no defect in the axle. On the contrary, if it appears that no vacuum can be obtained, the indication is that there is a crack in the axle which lets in the air and thus prevents the creation of the vacuum in the apparatus.

I claim as my invention and desire to secure by Letters Patent:

The herein described method of detecting cracks in axles lubricated with hard grease and provided with a permanent bore extending to the point of bearing, the same consisting in applying air or other fluid to the bore under high pressure sufficient to force out the customarily used hard grease stopping up a possible crack, whereby to reveal the presence of such crack by the hissing of the escaping fluid.

JAMES GOYNE.

Witnesses:
 GEO. H. HEISER,
 JOHN A. SACHSE.